United States Patent Office 3,457,271
Patented July 22, 1969

3,457,271
11-LOWER ALKYL-HEXAHYDRO-1-BENZAZEPINO
[3,2,1-h,i]PYRIDO[4,3-b]INDOLE
Aaron Cohen and Basil Heath-Brown, Welwyn Garden City, England, assignors to Hoffmann-La Roche Inc., Nutley, N.J., a corporation of New Jersey
No Drawing. Original application May 25, 1965, Ser. No. 458,766, now Patent No. 3,373,168, dated Mar. 12, 1968. Divided and this application Nov. 15, 1967, Ser. No. 683,113
Claims priority, application Great Britain, June 2, 1964, 22,736/64; Apr. 14, 1965, 22,738/65, 16,042/65
Int. Cl. C07d 57/02, 41/08; A61k 27/00
U.S. Cl. 260—296          3 Claims

ABSTRACT OF THE DISCLOSURE

11 - lower alkyl - hexahydro - 1-benzazepino[3,2,1-h,i] pyrido-[4,3-b]indole, intermediates in the preparation of 11-lower alkyl-octahydro-benzazepino[3,2,1-h,i]pyrido[4, 3-b]indoles. The last mentioned compounds are antidepressants.

RELATED CASES

This application is a division of U.S. patent application Ser. No. 458,766, filed May 25, 1965 now Patent No. 3,373,168, in the names of Aaron Cohen and Basil Heath-Brown. The benefit of the effective date of this co-pending application is hereby claimed.

DETAILED DESCRIPTION OF THE INVENTION

This invention is concerned with novel iminodibenzyl intermediates and with a process for the manufacture of them.

Iminodibenzyl derivatives of the invention have the formula

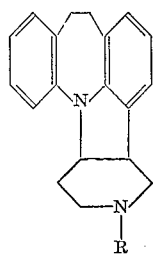

(I)

wherein R is a lower alkyl group (i.e., a straight or branched chain alkyl group having from 1 to 7 carbon atoms).

The invention also relates to acid addition salts thereof with pharmaceutically acceptable acids, such as the mineral acids, e.g., hydrochloric, hydrobromic, hydriodic, nitric, phosphoric, sulfuric, etc., and organic acids, such as acetic, citric, tartaric, lactic, maleic, benzenesulfonic, toluenesulfonic, methanesulfonic, etc.

The compounds of Formula I and their acid addition salts exhibit an antidepressant activity and are useful as antidepressant agents. The preferred derivatives are those compounds in which R is methyl or ethyl, and the hydrochloride salts thereof.

The process of the invention is carried out according to the following reaction scheme:

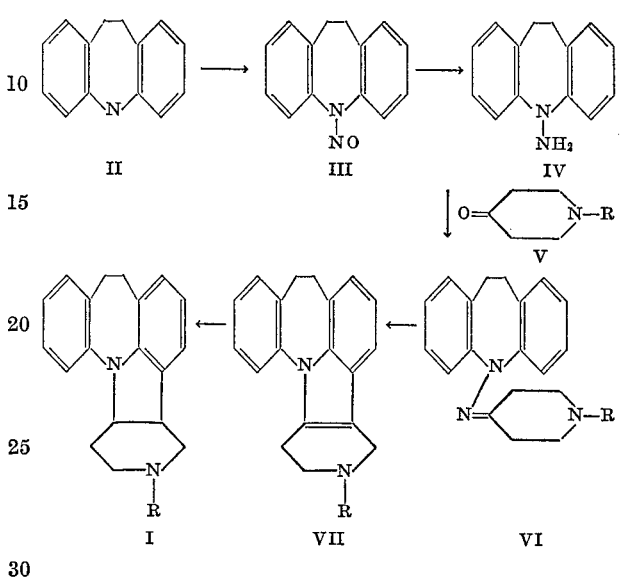

In the above reaction scheme R has the same meaning as in Formula I.

According to the process of the invention, the novel compounds of Formula I are prepared by converting iminodibenzyl (II) into its N-nitroso derivative (III), reducing the latter to N-amino-iminodibenzyl (IV), and, if desired, converting IV into an acid addition salt. The conversion of II to III can conveniently be carried out with nitrous acid, e.g., formed in situ from an alkali metal nitrite and a mineral acid, e.g., sodium nitrite and hydrochloric acid (e.g., 2 N) in the cold, in a solvent, e.g., N,N-dimethylformamide. As to the reduction of III to IV, this is conveniently carried out with an alkali metal Group III metal hydride, e.g., lithium aluminum hydride, sodium aluminum hydride, etc. N-amino-iminodibenzyl (IV) or an acid addition salt thereof is then reacted in an inert solvent with a 1-lower alkyl-4-oxopiperidine (V), the hydrazone formed (VI) is cyclized by treatment with an acidic cyclizing agent to form a cyclization product (VII), and VII reduced at the double bond common to the 5- and 6-membered heterocyclic rings thereof to form a compound of Formula I. If desired, compound I is then converted into an acid addition salt.

A suitable solvent for carrying out the reaction between IV and V in accordance with the invention is a lower alkanol (preferably methanol or ethanol), but it will be appreciated that other solvents which are inert under the conditions of the reaction can be used.

The cyclization of VI to VII can suitably be carried out by passing dry hydrogen chloride through the hot reaction mixture of compound VI. Alternatively, and this is by no means as convenient, the hydrazone VI can be isolated from the reaction mixture and cyclized by treatment with an acidic cyclization agent such as glacial acetic acid, a mineral acid, e.g., phosphoric acid or concentrated sulfuric acid. When phosphoric acid or concentrated sulfuric acid is used, the cyclization is preferably carried out in an inert solvent as ethanol.

The reduction of the cyclization product VII is preferably carried out using sodium in a mixture of tetrahydrofuran and liquid ammonia. Acidic reductions, for example, a reduction using zinc and hydrochloric acid, can be used, but tend to give lower yields.

The invention further relates to the novel intermediates of Formulae III through VII. Also, in addition to its use as an intermediate, 11-methyl-5,6,10,11,12,13-hexahydro-1-benzazepino-[3,2,1-h,i]pyrido[4,3-b]indole and acid addition salts thereof with pharmaceutically acceptable acids have a powerful antiserotonin and antihistamine effect, and are accordingly useful as antiserotonin and antihistamine agents, particularly where a combination of these properties is desired. The preferred salt is the hydrochloride salt.

As stated earlier, the novel compounds of Formula I are useful as antidepressants. They can be made up into pharmaceutical preparations which contain one or more of the compounds of Formula I or their pharmaceutically acceptable acid addition salts in admixture with a compatible pharmaceutical carrier. The preparations may be made up for enteral or parenteral administration.

Solid preparations for oral administration include tablets, pills, powders and granules. The carrier may be inorganic (e.g., talc) or organic (e.g., lactose, starch). Additives such as magnesium stearate (a lubricant) can also be included.

Liquid preparations for oral administration may comprise emulsions, solutions or suspensions containing the usual diluents commonly used in pharmacy such as water and petroleum jelly. Such liquid preparations may include wetting and suspending agents.

The preparations may take the form of capsules made of absorbable material (e.g., gelatin).

The liquid preparations may take the form of sterile aqueous or nonaqueous solutions, suspensions or emulsions. Useful suspension media are the polyoxyethylene glycols and vegetable oils. In this form the preparations may also contain adjuvants such as emulsifying and dispersing agents.

The pharmaceutical of preparations can be submitted to usual pharmaceutical operations such as sterilization and may also be compounded with other therapeutically valuable materials.

Typical doses of a compound of Formula I or a pharmaceutically acceptable acid addition salt thereof range from about 0.1 to about 2.0 mg. per kg. animal body weight, with dosage adjusted to species and individual requirements.

The following examples illustrate the process and products of the invention, but are not meant to limit the invention.

EXAMPLE 1

(A) The preparation of the starting material 193.5 g. (1 mole) of iminodibenzyl were stirred with 1935 ml. of N,N-dimethylformamide. 76 g. (1.1 mole) of sodium nitrite were added, following which 1000 ml. (2 moles) of 2 N hydrochloric acid were added over a period of 0.75 hour while keeping the temperature at 3° C. to 8° C. by means of a cooling bath. The cooling bath was removed and the mixture was stirred for 0.5 hour. It was then poured into 3 to 4 liters of water while stirring and stirred for 0.25 hour. The product was filtered off, washed with water and ice cold ethanol and dried in vacuo. The N-nitroso-iminodibenzyl obtained formed a yellowish-brown powder of melting point 112–113° C. Yield 215 g. (95.9 percent of theory).

215 g. (0.96 mole) of N-nitroso-iminodibenzyl in 860 ml. of dry tetrahydrofuran were added slowly to a stirred suspension of 43.7 g. (1.2×0.96 mole) of lithium aluminum hydride in 860 ml. of dry ether under nitrogen. The temperature was maintained at 25–30° C. by warming initially, and afterwards cooling if necessary. The addition took one hour and the reaction was slightly exothermic. After the addition was complete, the mixture was heated at 30–35° C. for 20 minutes, cooled in ice and decomposed in the usual manner. The alumina precipitate was filtered off, the filtrate was evaporized in vacuo and the residue was redissolved in 500 ml. of ether. The ether solution was stirred vigorously under nitrogen and treated with 1 liter of 2 N hydrochloric acid giving a precipitate of the N-amino-iminodibenzyl hydrochloride which was filtered off, washed with ether and N hydrochloric acid and dried in vacuo at 45° C. 181 g. (76.4 percent of theory) of the N-amino-iminodibenzyl hydrochloride, which formed a grey solid of melting point 132–135° C., were obtained. Recrystallization from alcohol ether yielded a white solid of melting point ca. 140° C. (with decomposition).

Treatment of the aqueous acid filtrate with alkali yielded 18 g. (8.9 percent of theory) of the free N-amino-iminodibenzyl which boiled at 145–148° C./0.08 mm. When crystallized from petroleum ether, this base melted at 54–55° C.

(B) The process (i.) 204.3 g. (0.829 mole) of N-amino-iminodibenzyl hydrochloride in 829 ml. of ethanol were treated with 93.6 g. (0.829 mole) of 1-methyl-4-piperidone and the mixture was heated under reflux for one hour. Dry hydrogen chloride was then passed in with stirring when an exothermic reaction occurred with the formation of ammonium chloride. The passing in of the hydrogen chloride was continued with heating and stirring for one hour or until the mixture was saturated. The reaction mixture was then filtered and the filtrate was evaporated in vacuo. The residue was shaken up with 1.3 liters of water and 300 ml. of ether and the clear aqueous solution was made alkaline and extracted several times with chloroform. The combined chloroform extracts were washed with water, dried and evaporated. The residue was crystallized from methanol. Three crops of a solid material were obtained, the total yield being 193.7 g. (81.1 percent of theory). The product formed straw-colored crystals of melting point 149–151° C. By further crystallization from ethyl acetate or by purification on alumina, 11 - methyl - 5,6,10,11,12,13 - hexahydro-1-benzazepino [3,2,1-h,i]pyrido[4,3-b]indole was obtained as a white solid of melting point 152–153° C. The hydrochloride has a melting point of 262–264° C. and showed the following characteristics: $\lambda_{max}$ at 213 m$\mu$, 259 m$\mu$, 295 m$\mu$ and 305 m$\mu$ and $\lambda_{min}$ at 241 m$\mu$ and 299 m$\mu$ (log $\epsilon$=4.49, 4.15, 4.03, 4.13, 3.93, 3.91 and 4.02, respectively).

The ethanolic solution of the N-amino-iminodibenzyl and the 4-methyl-4-piperidone, after heating under reflux can be evaporated to give the hydrazone as crystals of melting point 93–95° C. This hydrazone can then be cyclized by treatment with dry hydrogen chloride in ethanol.

11 - ethyl - 5,6,10,11,12,13 - hexahydro-1-benzazepino [3,2,1-h,i]pyrido[4,3-b]indole (melting point 94–95° C.) and its hydrochloride (melting point 276–277° C.) were obtained in a similar manner to that just described in using 1-ethyl-4-piperidone instead of 1-methyl-4-piperidone.

(ii.) 144.2 g. (0.5 mole) of 11-methyl-5,6,10,11,12,13-hexahydro - 1 - benzazepino[3,2,1-h,i]pyrido[4,3-b]indole were stirred with 1440 ml. of dry tetrahydrofuran and 2880 ml. of liquid ammonia and treated with 25.3 g. (1.1 mole) of sodium. The sodium was added in small pieces until a permanent blue color resulted. The addition took ca. 0.5 hour. After a further 0.5 hour the mixture was treated with 80 g. (1.5 mole) of ammonium chloride and allowed to evaporate. The tetrahydrofuran was removed in vacuo and the residue was treated with chloroform and water. Separation and evaporation of the chloroform layer yielded crude 11 - methyl-5,6,9b,10,11,12,13,13a-octahydro - 1 - benzazepino[3,2,1-h,i]pyrido[4,3-b]indole. This crude product was crystallized from methanol to give the pure product of melting point 121–123° C. The yield was 132.8 g. (91.4 percent of theory). The hydrochloride melted at 265–267° C. and showed the following characteristics: $\lambda_{max}$ at 212 m$\mu$ and 287 m$\mu$, $\lambda_{min}$ at 245 m$\mu$ (log $\epsilon$=4.39, 4.08 and 3.52, respectively).

11 - ethyl - 5,6,9b,10,11,12,13,13a-octahydro-1-benzazepino[3,2,1 - h,i]pyrido[4,3 - b]indole and its hydrochloride were manufactured according to the details given in part C using the appropriate 11-ethyl-hexahydro compound. The hydrochloride melted at 245° C.

The following illustrates the manner in which the novel pharmaceutically active compounds of the invention can be made up into a pharmaceutical preparation.

25 g. of 11-methyl-5,6,9b,10,11,12,13,13a-octahydro-1-benzazepino[3,2,1-h,i]pyrido[4,3-b]indole hydrochloride, 125 g. of lactose, 4 g. of talc and 1 g. of magnesium stearate are dry-mixed in an opaque container with the exclusion of air. The dry-mixture is compressed into scored tablets each of 8 mm. diameter, weighing 155 g. and containing 25 mg. of active substance.

Tablets, each containing 25 mg. of 11-methyl-5,6,10,-11,12,13 - hexahydro - 1 - benzazepino[3,2,1-h,i]pyrido [4,3-b]indole hydrochloride, are prepared by dry-mixing 50 g. of active substance, 250 g. of lactose, 8 g. of talc and 2 g. of magnesium stearate in an opaque container with the exclusion of air and compressing the dry mixture into scored tablets, each of 8 mm. diameter and weighing 155 mg.

We claim:
1. A compound selected from the group consisting of (a) a compound of the formula

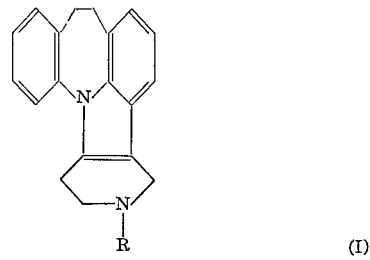

(I)

wherein R is lower alkyl; and (b) an acid addition salt of a compound of Formula I with a pharmaceutically acceptable acid.

2. A compound as defined in claim 1 of the formula 11 - ethyl - 5,6,10,11,12,13 - hexahydro - 1-benzazepino [3,2,1-h,i]pyrido[4,3-b]indole.

3. A compound as defined in claim 1 of the formula 11 - methyl - 5,6,10,11,12,13 - hexahydro-1-benzazepino [3,2,1-h,i]pyrido[4,3-b]indole.

References Cited

UNITED STATES PATENTS 3,299,078   1/1967   Pachter _____ 260—296

HENRY R. JILES, Primary Examiner

A. L. ROTMAN, Assistant Examiner

U.S. Cl. X.R.

260—239, 293; 424—244, 263